United States Patent
Schilt et al.

(10) Patent No.: US 9,680,287 B2
(45) Date of Patent: Jun. 13, 2017

(54) OPTO-OPTICAL MODULATION OF A SATURABLE ABSORBER FOR HIGH BANDWIDTH CEO STABILIZATION OF A FEMTOSECOND LASER FREQUENCY COMB

(71) Applicant: Universite de Neuchatel, Neuchatel (CH)

(72) Inventors: Stephane Schilt, Echandens (CH); Martin Hoffmann, Zurich (CH); Thomas Sudmeyer, Zurich (CH)

(73) Assignee: UNIVERSITÉ DE NEUCHÂTEL (CH)

( * ) Notice: Subject to any disclaimer, the term of this patent is extended or adjusted under 35 U.S.C. 154(b) by 0 days.

(21) Appl. No.: 15/022,112

(22) PCT Filed: Sep. 17, 2014

(86) PCT No.: PCT/EP2014/069773
§ 371 (c)(1),
(2) Date: Mar. 15, 2016

(87) PCT Pub. No.: WO2015/049106
PCT Pub. Date: Apr. 9, 2015

(65) Prior Publication Data
US 2016/0226216 A1    Aug. 4, 2016

(30) Foreign Application Priority Data
Oct. 1, 2013   (CH) .................................... 01686/13

(51) Int. Cl.
*G02F 1/03*     (2006.01)
*G02F 1/01*     (2006.01)
(Continued)

(52) U.S. Cl.
CPC .......... *H01S 3/1118* (2013.01); *G02F 1/0126* (2013.01); *H01S 3/0057* (2013.01);
(Continued)

(58) Field of Classification Search
USPC ................................. 359/279, 244, 326, 245
See application file for complete search history.

(56) References Cited

U.S. PATENT DOCUMENTS

| 6,038,055 | A  | 3/2000 | Hänsch et al. |
| 6,785,303 | B1 | 8/2004 | Holzwarth et al. |

(Continued)

FOREIGN PATENT DOCUMENTS

DE          10135453 A1     1/2003

OTHER PUBLICATIONS

International Search Report and Written Opinion for PCT/EP2014/069773, dated Mar. 26, 2015, 13 pages.
(Continued)

Primary Examiner — Mohammed Hasan
(74) Attorney, Agent, or Firm — Blank Rome LLP

(57) ABSTRACT

A laser source that generates an optical frequency comb, comprising a pumped laser medium placed inside an optical cavity that incorporates at least one optically-controlled modulator, a detector generating an error signal, and a modulation optical source that is controlled by the error signal and whose radiation is directed onto said optically-controlled modulator thereby stabilizing the Carrier-Envelope Offset (CEO) frequency and/or the CEO phase and/or the repetition rate of said source.

15 Claims, 6 Drawing Sheets

(51) Int. Cl.
| | |
|---|---|
| H01S 3/11 | (2006.01) |
| H01S 3/13 | (2006.01) |
| H01S 3/131 | (2006.01) |
| H01S 3/16 | (2006.01) |
| H01S 3/17 | (2006.01) |
| H01S 3/00 | (2006.01) |
| H01S 3/0941 | (2006.01) |
| G02F 1/35 | (2006.01) |

(52) U.S. Cl.
CPC .......... *H01S 3/0085* (2013.01); *H01S 3/0092* (2013.01); *H01S 3/0941* (2013.01); *H01S 3/1307* (2013.01); *H01S 3/1312* (2013.01); *H01S 3/1608* (2013.01); *H01S 3/1618* (2013.01); *H01S 3/17* (2013.01); *G02F 2001/3528* (2013.01); *G02F 2203/56* (2013.01); *H01S 3/1675* (2013.01)

(56) References Cited

U.S. PATENT DOCUMENTS

| | | | |
|---|---|---|---|
| 8,120,841 B2 | 2/2012 | Sosabowski et al. | |
| 2010/0195677 A1 | 8/2010 | Fermann et al. | |
| 2010/0225897 A1 | 9/2010 | Fermann et al. | |
| 2012/0327959 A1* | 12/2012 | Fermann | H01S 3/08059 372/6 |
| 2013/0314703 A1* | 11/2013 | Cox | G02F 1/3536 356/326 |

OTHER PUBLICATIONS

S.A. Meyer et al., "Diode-Pumped Yb:KYW Femtosecond Laser Frequency Comb with Stabilized Carrier-Envelope Offset Frequency", The European Physical Journal D., vol. 48, 2008, pp. 19-26.

C.-C. Lee, et al., "Frequency Comb Stabilization with Bandwidth Beyond the Limit of Gain Lifetime by an Intracavity Graphene Electro-Optic Modulator", Optics Letters, vol. 37, No. 15, Aug. 1, 2012, pp. 3084-3086.

M. Hoffman, et al., "Opto-Optical Modulation of an Intra-Cavity SESAM for Low-Noise CEO Stabilization of a Femtosecond Laser", Optical Society of America, 2014, 2 pages.

M. Hoffman, et al., "CEO Stabilization of a Femtosecond Laser Using a SESAM as Fast Opto-Optical Modulator", Optical Society of America, vol. 21, No. 24, 2013, 11 pages.

M. C. Stumpf, et al., "First Fully Stabilized Frequency Comb from a SESAM-Modelocked 1.5-μm Solid-State Oscillator", IEEE, 2010, 2 pages.

S. Schilt, et al., "Fully Stabilized Optical Frequency Comb with Sub-Radian CEO Phase Noise from a SESAM-Modelocked 1.5-μm Solid-State Laser", Optics Express 19, Issue 24, 2011, pp. 1-11.

M. Hoffmann, et al., "Low-Noise CEO Stabilization of a Femtosecond DPSSL Using an Optically-Pumped SESAM as Fast Opto-Optical Modulator", Advanced Solid-State Lasers Congress Postdeadline Papers, 2013, 3 pages.

T. Hellwig, et al., "Toward an All-Optically Stabilized Frequency Comb Based on a Mode-Locked Fiber Laser", Optics Letters, vol. 39, No. 3, Feb. 1, 2014, pp. 525-527.

V. Dolgovskiy, et al., "Cross-Influence Between the Two Servo Loops of a Fully Stabilized Er:fiber Optical Frequency Comb", Journal of Optical Society of America B, vol. 29, No. 10, Oct. 2012, pp. 2944-2957.

C.-C. Lee, et al., "Broadband Graphene Electro-Optic Modulators with Sub-Wavelength Thickness", Optics Express, vol. 20, No. 5, Feb. 27, 2012, pp. 5264-5269.

V. G. Savitski, et al., "Optically Pumped Saturable Bragg Reflectors: Nonlinear Spectroscopy and Application in Ultrafast Lasers", IEEE Journal of Quantum Electronics, vol. 46, No. 11, Nov. 2010, pp. 1650-1655.

W. Zhang, et al., "Characterizing a Fiber-Based Frequency Comb with Electro-Optic Modulator", IEEE Transactions on Ultrasonics, Ferroelectrics, and Frequency Control, vol. 59, No. 3, Mar. 2012, pp. 432-438.

T. W. Hansch, "Nobel Lecture: Passion for Precision", Reviews of Modern Physics, vol. 78, No. 4, Oct.-Dec. 2006, pp. 1297-1309.

C. J. Saraceno, et al., "275 W Average Output Power from a Femtosecond Thin Disk Oscillator Operated in a Vacuum Environment", Optics Express, vol. 20, No. 21, Oct. 8, 2012, pp. 23535-23541.

V. G. Savitski, et al., "Optical Trapping with "On-Demand" Two-Photon Luminescence Using Cr:LiSAF Laser with Optically Addressed Saturable Bragg Reflector", Optics Express, vol. 20, No. 7, Mar. 26, 2012, pp. 7066-7070.

International Preliminary Report on Patentability for PCT/EP2014/069773, dated Apr. 5, 2016, 8 pages.

\* cited by examiner

OPTO-OPTICAL MODULATION OF A SATURABLE ABSORBER FOR HIGH BANDWIDTH CEO STABILIZATION OF A FEMTOSECOND LASER FREQUENCY COMB

RELATED APPLICATIONS

This application is a national phase of PCT/EP2014/069773, filed on Sep. 17, 2014, which claims the benefit of Switzerland Application No. 01686/13, filed on Oct. 1, 2013. The entire contents of those applications are incorporated herein by reference.

FIELD OF THE INVENTION

The present invention relates, in embodiment, to modelocked laser sources and in particular, to a laser source of the 'optical comb' type, such as for example generated from femtosecond solid-state lasers, diode-pumped solid-state lasers or from fiber lasers, as well as applications such as metrology.

DESCRIPTION OF RELATED ART

Optical frequency combs have been a revolution in various research fields in physics since their first demonstration at the end of the last century. By providing a direct and phase-coherent link between optical and microwave frequencies, they enable the measurement of optical frequencies with extreme precision, they are an essential component in the development of novel optical atomic clocks with unprecedented frequency stability and also constitute a key element of ultra-low noise microwave oscillators, to name a few examples. Furthermore, they have many new emerging applications in optical telecommunications, broadband high-precision spectroscopy, etc.

An optical frequency comb is generated from an ultrafast pulsed laser that emits ultra-short pulses, with a pulse duration typically shorter than 1 ps, in which all the modes are phase-coherent (modelocked), which results in a comb-like optical spectrum composed of discrete, equidistantly-spaced lines. Each of these optical frequencies is determined by only two radio-frequencies, namely the spacing between the lines, which corresponds to the repetition rate $f_{rep}$ of the laser pulse train, and the carrier-envelope offset (CEO) frequency $f_{CEO}$, which is the frequency offset of the first comb line from the origin when the comb spectrum is extrapolated towards zero frequency. Physically, the CEO frequency results from the difference between phase and group velocities within the laser cavity, leading to a phase slip between the pulse envelop and the underlying electric field. Stabilizing the two degrees of freedom of the frequency comb, i.e., the repetition rate and the CEO frequency, leads to a fully-stabilized optical frequency comb in which each comb line has a known optical frequency $v_N$ that is traceable to the unit of second of the international system of unit (the SI second): $v_N = N f_{rep} + f_{CEO}$, where N is a positive integer number that identifies an individual comb line.

The first demonstration of the stabilization of the CEO frequency in a modelocked laser that led to the first optical frequency comb was honoured with the Nobel Prize in Physics in 2005. The traditional method to stabilize the CEO frequency in a frequency comb is via a modulation of the pump power of the modelocked laser. This can be done using an acousto-optic modulator in the pump beam, which is the traditional method used in Ti:sapphire lasers. For femtosecond lasers that can be pumped by a diode laser, such as fiber lasers (Er, Yb, Tm, etc) or diode-pumped solid-state lasers (DPSSLs), a straightforward modulation of the pump power can be realized by modulating the current of the pump laser. The present invention proposes a new method for CEO control and stabilization that provides a higher control bandwidth and thus enables significantly improved noise characteristics. The method has the potential for CEO-stabilization of new laser technologies that cannot be stabilized with current stabilization methods, such as high repetition rate lasers. The method can also be applied to high bandwidth stabilization of the repetition rate of a frequency comb, e.g., by stabilizing one comb mode to an optical frequency standard such as an ultra-stable ultra-narrow linewidth laser source.

Examples of realization in this field of endeavour can be found, among other, in the following references:

T. W. Hänsch, "Nobel lecture: passion for precision," Rev Mod Phys 78, 1297-1309 (2006).

S. Schilt, N. Bucalovic, V. Dolgovskiy, C. Schori, M. C. Stumpf, G. Di Domenico, S. Pekarek, A. E. H. Oehler, T. Sudmeyer, U. Keller, and P. Thomann, "Fully stabilized optical frequency comb with sub-radian CEO phase noise from a SESAM-modelocked 1.5-µm solid-state laser," Opt. Express 19, 24171-24181 (2011).

C.-C. Lee, S. Suzuki, W. Xie, and T. R. Schibli, "Broadband graphene electro-optic modulators with sub-wavelength thickness", Optics Express 20, 5264-5269 (2012).

The method of changing the operation conditions of a modelocked laser by pumping the semiconductor saturable absorber mirror (SESAM) optically has been demonstrated before in a completely different situation: the laser operation was changed between continuous wave and modelocking:

V. G. Savitski, N. K. Metzger, S. Calvez, D. Burns, W. Sibbett, and C. T. A Brown, "Optical trapping with "on-demand" two-photon luminescence using Cr:LiSAF laser with optically addressed saturable Bragg reflector", Optics Express 20, 7066-7070 (2012).

V. G. Savitski, A. J. Kemp, S. Calvez, et al., "Optically Pumped Saturable Bragg Reflectors: Nonlinear Spectroscopy and Application", IEEE Journal of Quantum Electronics 46, 1650-1655 (2010).

It is also known to use SESAMs in high-power modelocked laser devices, for example in C. J. Saraceno, et al., "275 W average output power from a femtosecond thin disk oscillator operated in a vacuum environment," Opt. Express 20, 23535-23541 (2012).

In patent literature, the documents US2012/0327959, US6038055, US6785303, US2010/0195677, US2010/0225897, US2012/0327959, US8120841 relate to optical frequency combs and their stabilization, with methods and devices different from those of the present invention.

Today, optical frequency combs are based on different modelocked laser technologies. The first frequency combs were based on Ti:sapphire lasers, but nowadays fiber-based lasers (e.g., Er-fiber, Yb fiber, Tm fiber) are more widely used due to their simpler and more reliable architecture. Diode-pumped solid-state lasers (DPSSL) constitute another emerging technology for frequency combs. The traditional method to control and stabilize the CEO frequency is by feedback to the pump power of the modelocked laser. This is generally implemented using an acousto-optic modulator in a Ti:sapphire laser.

Self-referencing of fiber lasers and DPSSLs benefits from the possibility to directly modulate the pump power via a modulation of the drive current of the pump diode, which constitutes the standard stabilization method in these combs.

Using this approach, CEO stabilization with sub-radian residual integrated phase noise has been achieved for various gain materials and laser systems, e.g. Er and Yb fibre lasers, Er:Yb:glass, Yb:KYW or Cr:forsterite DPSSLs, with a feedback loop bandwidth typically ranging from a few kHz up to several tens of kHz. The bandwidth of such a feedback loop is physically limited by the gain lifetime, which for common broadband gain materials such as Er or Yb is generally quite long, corresponding to a bandwidth in the ≈10 kHz range. In order to access the feedback bandwidth required to achieve a tight CEO phase-lock, the use of a phase-lead filter was often necessary to extend the overall loop bandwidth beyond the limit of the gain lifetime. Further increasing the stabilization bandwidth, for instance to achieve a better lock or to phase-lock lasers with a larger CEO linewidth, requires another approach to control the CEO beat frequency.

The limitation given by the gain lifetime can be circumvented by the direct use of intra-cavity loss-modulation. In such a case, a larger bandwidth limited by the recovery time of the loss-modulator can be achieved. A proven method that makes use of such a loss-modulator is the intra-cavity graphene electro-optic modulator (EOM) described in Optics Express 20, 5264-5269 (2012) and by patent application US2012327959. While a large feedback loop bandwidth of 1 MHz was demonstrated using this technique, the intra-cavity graphene EOM does not seem to be suitable for the stabilization of high-power lasers, due to the relatively high non-saturable losses (5%) of the absorber material, in comparison to the available pulse modulation (2%).

Furthermore, such an approach is not power-scalable because of the required lateral current injection and the fixed aperture of the graphene EOM.

A high bandwidth actuator is also required to stabilize a frequency comb to an optical frequency standard, which is commonly done by stabilizing one mode of the comb to an ultra-narrow reference laser. A common method to realize this is to use an intra-cavity EOM, such as described in IEEE Trans. Ultrason. Ferroelectr. Freq. Control 59, 432-438 (2012).

It is also known from the disclosure in J. Opt. Soc. Am. B 29, 2944-2957 (2012) that the CEO frequency $f_{CEO}$ and the repetition rate $f_{rep}$ of the comb, are mutually coupled.

SUMMARY DESCRIPTION OF THE INVENTION

The present invention includes, in embodiments, a high-bandwidth loss modulator that acts on the CEO beat frequency or on the repetition rate of an optical frequency comb by optically pumping an intra-cavity control element, such as a semiconductor saturable-absorber mirror (SESAM) in a modelocked laser or a similar gain or loss medium. This high-bandwidth modulation channel offers the advantage to be extendable to high-power lasers as well, thanks to the excellent power capability of SESAM devices. In an exemplary embodiment, a 110-mW SESAM-modelocked DPSSL was used and the invention was compared to the standard method of pump current modulation in the exact same laser. Significant improvements were obtained in terms of integrated phase noise, feedback-loop bandwidth, as well as Allan deviation of the so-stabilized CEO frequency. This particular DPSSL is considered here only to exemplify one possible implementation and achievements of the proposed method, but the invention can also be used with many other types of modelocked lasers, such as fibre lasers and other types of DPSSLs.

One major problem that the present invention solves is the achievable speed of the modulation. CEO stabilization via feedback to the pump power (either by pump beam modulation or by diode current modulation) is usually limited in terms of bandwidth to a couple of tens of kilohertz by the upper state lifetime of the gain material. This limits the noise performances of the frequency comb in the best cases, and even prevents the CEO stabilization for lasers with higher CEO noise.

In a similar way, stabilization of the repetition rate of a frequency comb to an optical frequency reference is limited in terms of bandwidth when controlling the repetition rate mechanically (via a piezoelectric actuator to change the cavity length) or using the same pump current modulation as traditionally used for frequency comb self-referencing, which prevents fully benefiting from the high frequency stability and low phase noise properties of the repetition rate.

The present invention proposes a new method for CEO stabilization that can provide a much larger bandwidth. It is based on a high-bandwidth loss modulator that acts on the CEO beat frequency by optically pumping an intra-cavity SESAM. The same SESAM as used for modelocking operation of the laser can be additionally used for CEO control in the simplest implementation of the method. Alternatively, an additional SESAM can be introduced in the cavity for CEO control. The proposed high-bandwidth modulation channel is further amenable to high-power lasers, since SESAMs exhibit extremely good damage properties, low loss and low dispersion, which is not the case for most alternative methods. The method is thus well suited to the high power thin disk laser technology for instance.

In a different embodiment, the invention can also be used to stabilize the repetition rate of a frequency comb, by phase-locking one comb mode to an optical frequency standard such as an ultra-stable laser source, with a similar control bandwidth as for the stabilization of the CEO frequency. This functionality can also be realized by optically pumping the SESAM used in the laser to achieve the modelocking operation or using an additional SESAM.

Because of the nature of the modulated device (a SESAM in our demonstrated case), the following benefits are obtained:

high damage threshold, which results in the feasibility to be used in high-power lasers. This is a major advantage for technologies such as ultrafast thin disk lasers. This has also a large impact for ultra-stable frequency comb generation in the VUV/XUV spectral regions.

potentially very high modulation bandwidth, enabling carrier envelope offset stabilization in lasers that could not be stabilized as so far due to their higher CEO noise (e.g. high repetition rate lasers), or repetition rate stabilization to an optical frequency standard with a high fidelity.

The above stated benefits and solutions are provided, in the invention, by the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
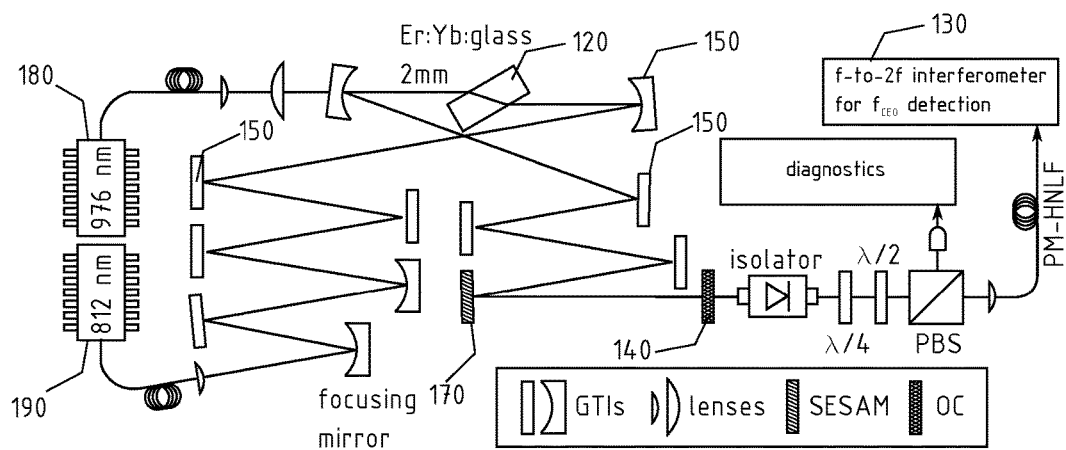
FIG. 1 represents schematically an exemplary but not limiting mode of realization of the present invention.

The exemplary embodiment of the invention represented in FIG. 1, comprises a SESAM-modelocked Er:Yb:glass laser oscillator referred to as ERGO, which emits a 15-nm wide spectrum (FWHM) at 1558 nm. It must be understood, however, that the invention is also applicable to other modelocked laser systems. The ERGO laser consists of a standing-wave resonator with a 2-mm thick Er:Yb:glass gain medium 120, a plurality of Gires-Tournois interferometer (GTI-) mirrors 150 with a group-delay dispersion (GDD) of −100 fs$^2$ each for solution formation, an output coupler 140 with a transmission of 1.7%, and a SESAM to obtain self-starting and reliable modelocking. The SESAM 170 consists of a standard anti-resonant design in this particular case, but the invention also applies to all other types of SESAM structures or any other type of optically-controlled modulator.

Moreover, the laser source of the invention could include, in the optical cavity, in alternative or in combination with the GTI-type dispersive mirrors, any kind of dispersive mirror or mirrors, for example chirped mirrors.

The gain medium of the Er:Yb:glass laser is pumped by a telecom-grade single-mode diode laser 180 providing a continuous wave (cw) optical power of roughly 600 mW at a wavelength of 976 nm. The laser oscillator has a repetition rate of 75 MHz and emits 170-fs transform-limited solution pulses at an average output power of 110 mW. The self-referencing of this frequency comb was previously achieved using the standard method of feedback to the current of the laser diode that pumps the Er:Yb:glass gain material. In this case, a tight lock of the CEO beat is achieved with a modest feedback bandwidth of about 5.5 kHz.

The present invention comprises a new optically-controlled modulator for CEO frequency control realized by focusing a suitable modulated light source 190 onto the SESAM inside the fs-laser resonator. In the embodiment of the invention represented by FIG. 1, the additional light source 190 comprises an 812-nm, multimode fibre-coupled laser diode. Due to geometrical constraints of the fs-laser cavity, the pump beam was focused onto the SESAM with an incidence angle of about 5 deg. The obtained pump spot was spatially overlapped with the intra-cavity fs-pulses on the SESAM. However, it was roughly twice in size, because of the multimode fibre output of the 812-nm pump laser.

The CEO beat can be generated and detected by any known means; in the presented example this is achieved by means of a standard f-to-2f interferometer 130 after supercontinuum spectrum generation in a polarization-maintaining highly-nonlinear fibre (PM-HNLF), coupled by a suitable optical output coupler 140. However, other types of non-linear media can be used as well for supercontinuum generation, such as photonic crystal fibres (PCF) or waveguides. For the results shown here, the CEO beat frequency was set to roughly 20 MHz by slightly adjusting the pump laser current of the gain medium, but this is not a limiting feature of the invention.

Figure 2:
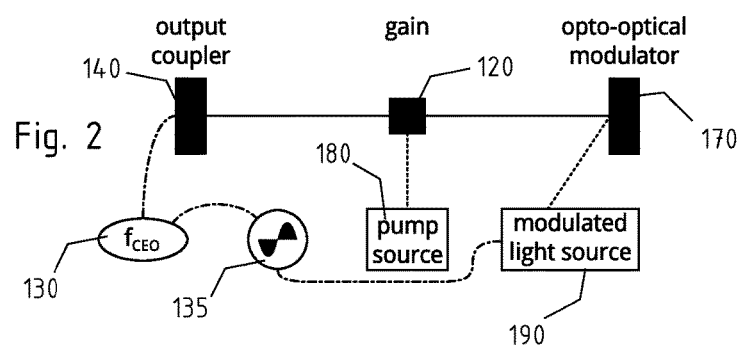
FIG. 2 represents schematically the principle of the invention implemented in a modelocked laser.

FIG. 2 represents a generalization of the detailed embodiment of FIG. 1. The invention includes a laser gain medium 120 that is pumped by a suitable pump source 180 such as to induce emission of laser radiation. The output coupler 140 samples the laser radiation and sends it to the detector 130 that generates an error signal 135, which is used to modulate a light source 190. The radiation of the light source 190 is directed to the optically-controlled optical modulator (OOM) 170 that is incorporated in the laser cavity. It will be readily understood that these elements of the invention can be embodied by the specific elements represented by the same reference numbers in the embodiment of FIG. 1, or by any other suitable means.

Figure 3:
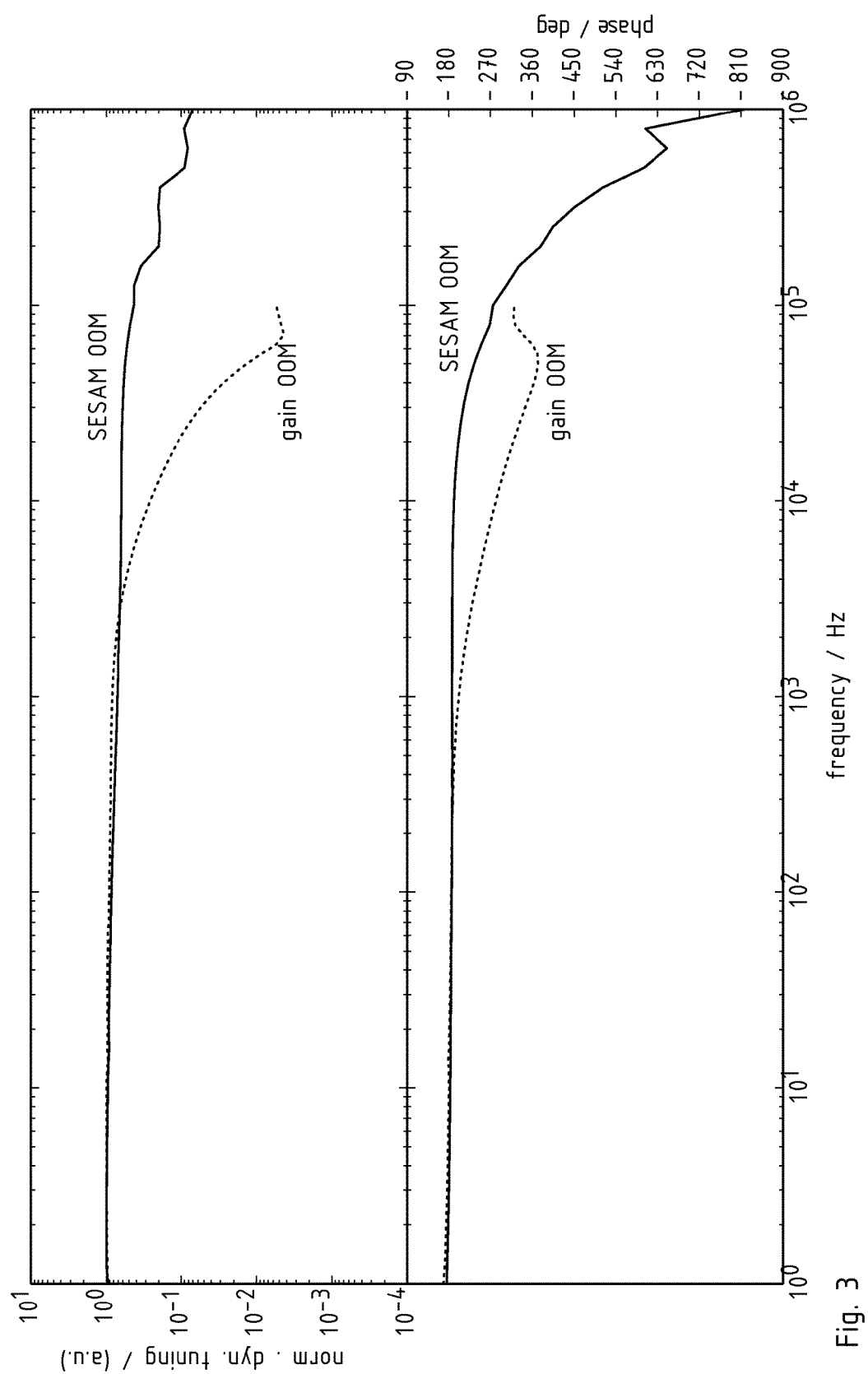
FIG. 3 is an exemplary plot of the CEO transfer functions obtained using the present invention in comparison with known stabilization methods.

A fundamental parameter for an actuator to be used for CEO frequency stabilization is its modulation bandwidth, i.e., how fast it is able to act on the CEO frequency $f_{CEO}$. A large enough bandwidth is needed to correct for fast frequency fluctuations contributing to the linewidth of the CEO beat, if a tight lock is targeted. The bandwidth of the new proposed SESAM-pumped modulator was determined in the implementation example of the invention by measuring the CEO-beat transfer function, i.e., the amplitude and phase response of $f_{CEO}$ to a modulation of the SESAM pump laser. The upper panel of FIG. 3 shows the CEO dynamic tuning range achieved with the present invention in comparison to the standard method of gain pump modulation, whereas the lower panel displays the corresponding phase shift.

Generally, an actuator that acts on the CEO frequency $f_{CEO}$ also has an effect on the repetition rate $f_{rep}$ of the comb, which results from the existing coupling between the control of $f_{CEO}$ and $f_{rep}$. As a consequence, the present invention can also be used for high bandwidth control and stabilization of the comb repetition rate, e.g., by phase-locking to an optical frequency standard.

Example of CEO Stabilization Performance Achieved with the Invention

The high bandwidth of the SESAM-pumped modulator enables a straightforward tight lock of the CEO beat to be achieved. The stabilization is realized in one possible embodiment of the invention by feeding the amplified and low-pass filtered output signal from an f-to-2f interferometer into a digital phase detector, where it is compared to a reference signal. Any sufficiently stable reference signal can be used here; the presented example relies on a frequency synthesizer which is stabilized to an H-maser. The phase-detector output, which serves as a phase error signal, is then fed to a suitable controller circuit, for example a Proportional-Integrator-Derivative (PID) servo-controller used as modulation source of the current driver that controls the SESAM pump laser.

Figure 4:
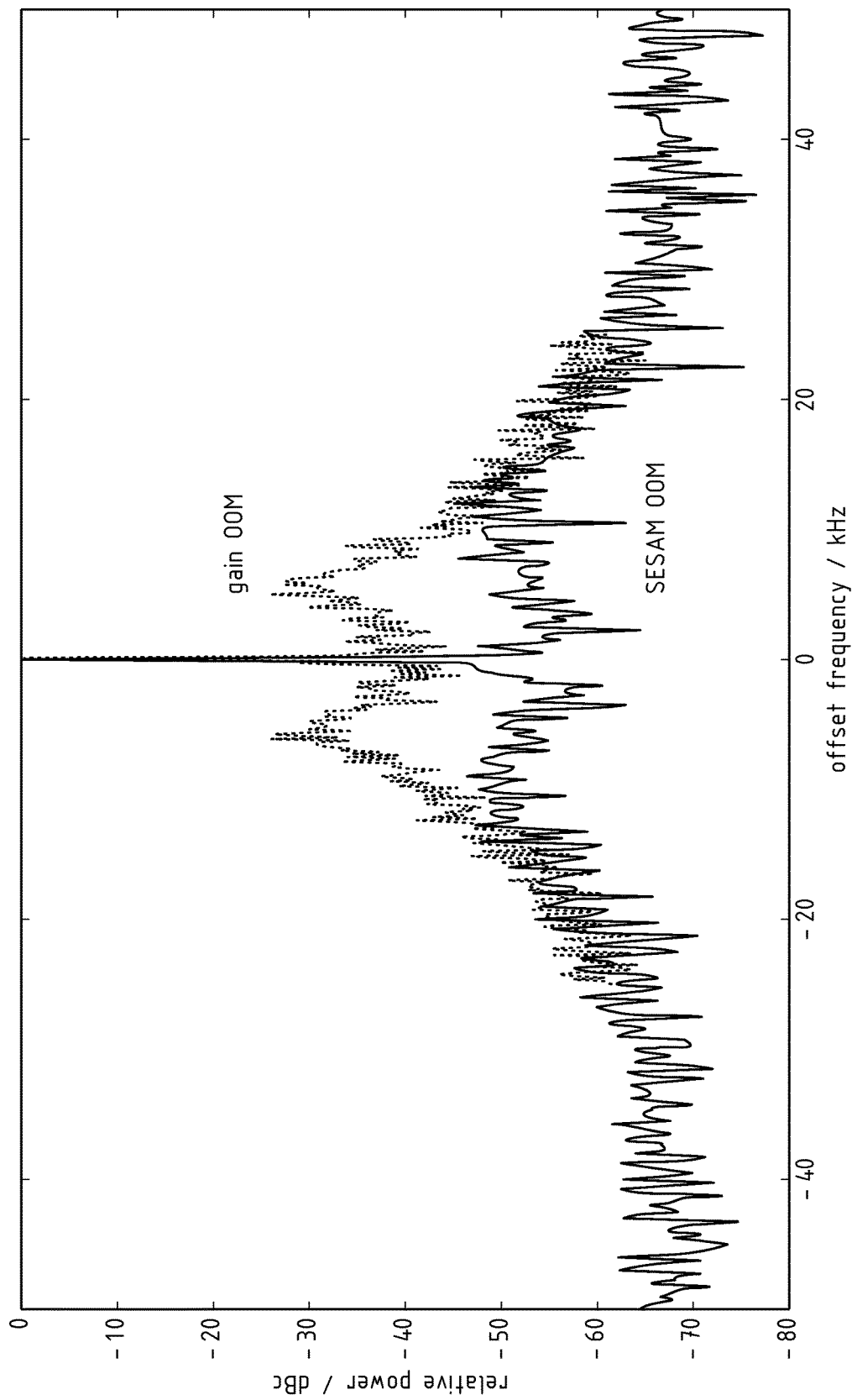
FIG. 4 represents the RF spectra of the CEO beat obtained with the actuator of the present invention where the SESAM is optically modulated and with the standard method of pump current modulation of the gain medium for comparison.
Figure 5:
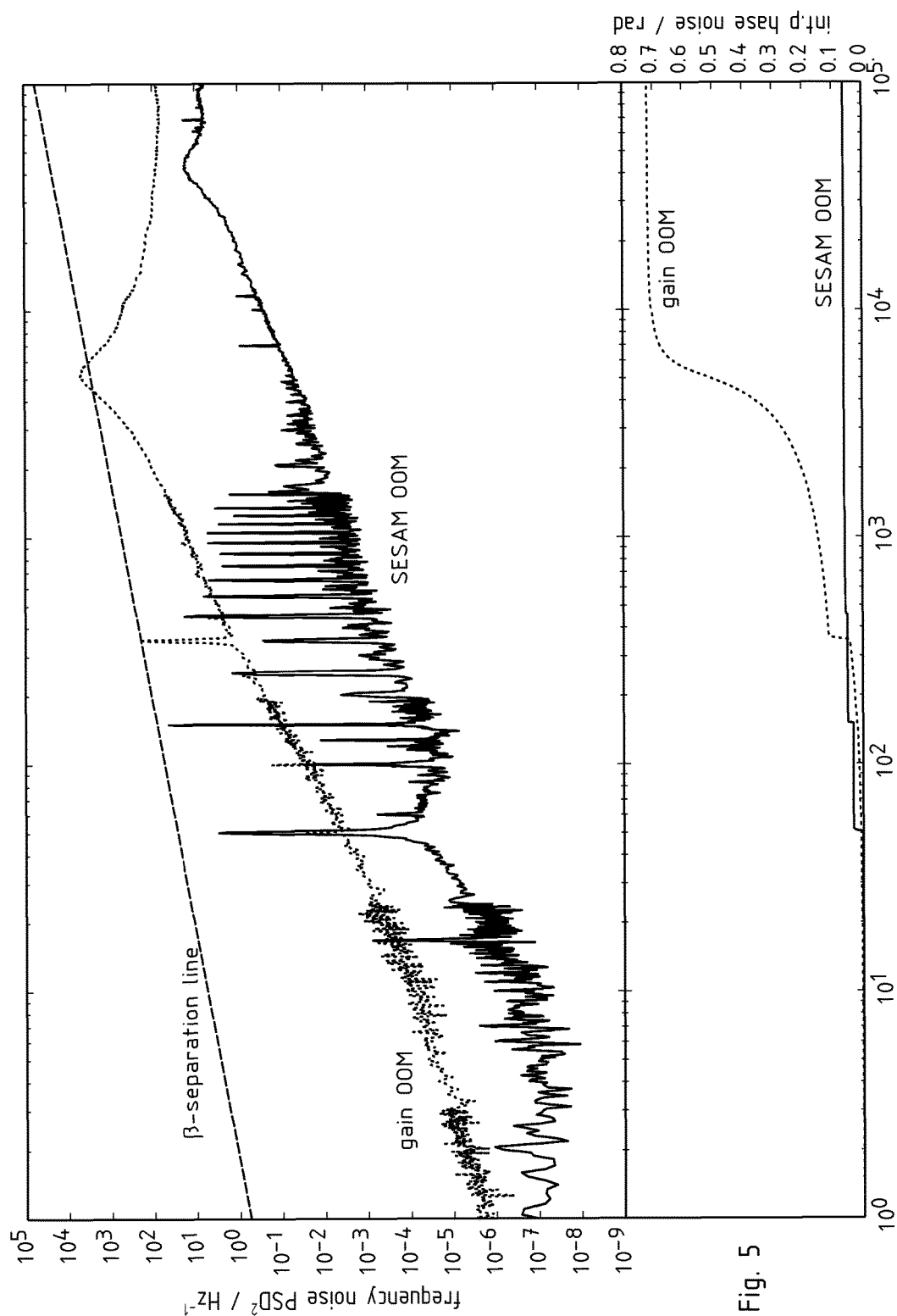
FIG. 5 plots the frequency-noise power spectral density (PSD) obtained with the present invention and with conventional stabilization methods, as well as the corresponding integrated phase-noise.

An example of the radio-frequency (RF) spectrum obtained for the stabilized CEO beat stabilized with the present invention is shown in FIG. 4, where it is compared to the standard stabilization with feedback to the pump laser of the gain material. An improvement by ≈20 dB is obtained in the signal-to-noise ratio using the present invention in comparison to the result obtained with pump current modulation of the gain material. For a more quantitative comparison of the noise performance of the two stabilization methods, FIG. 5 shows in the top panel the corresponding frequency noise power spectral density (PSD) of the stabilized CEO beat as a function of the Fourier frequency obtained with the present invention and with the standard method of feedback to the pump laser current in the same laser.

The stabilized CEO signal presents a significant improvement with the new SESAM-pumped modulator over the standard gain modulation at all Fourier frequencies owing to the larger achievable control bandwidth. In the particular case of the ERGO laser exemplified here, this results in a small residual integrated phase noise of 63 mrad (1 Hz-100 kHz), which is better by more than an order of magnitude than the value of 720 mrad obtained for gain pump modulation. The lower panel of FIG. 5 shows the corresponding integrated phase-noise for the two stabilization methods.

Figure 6:
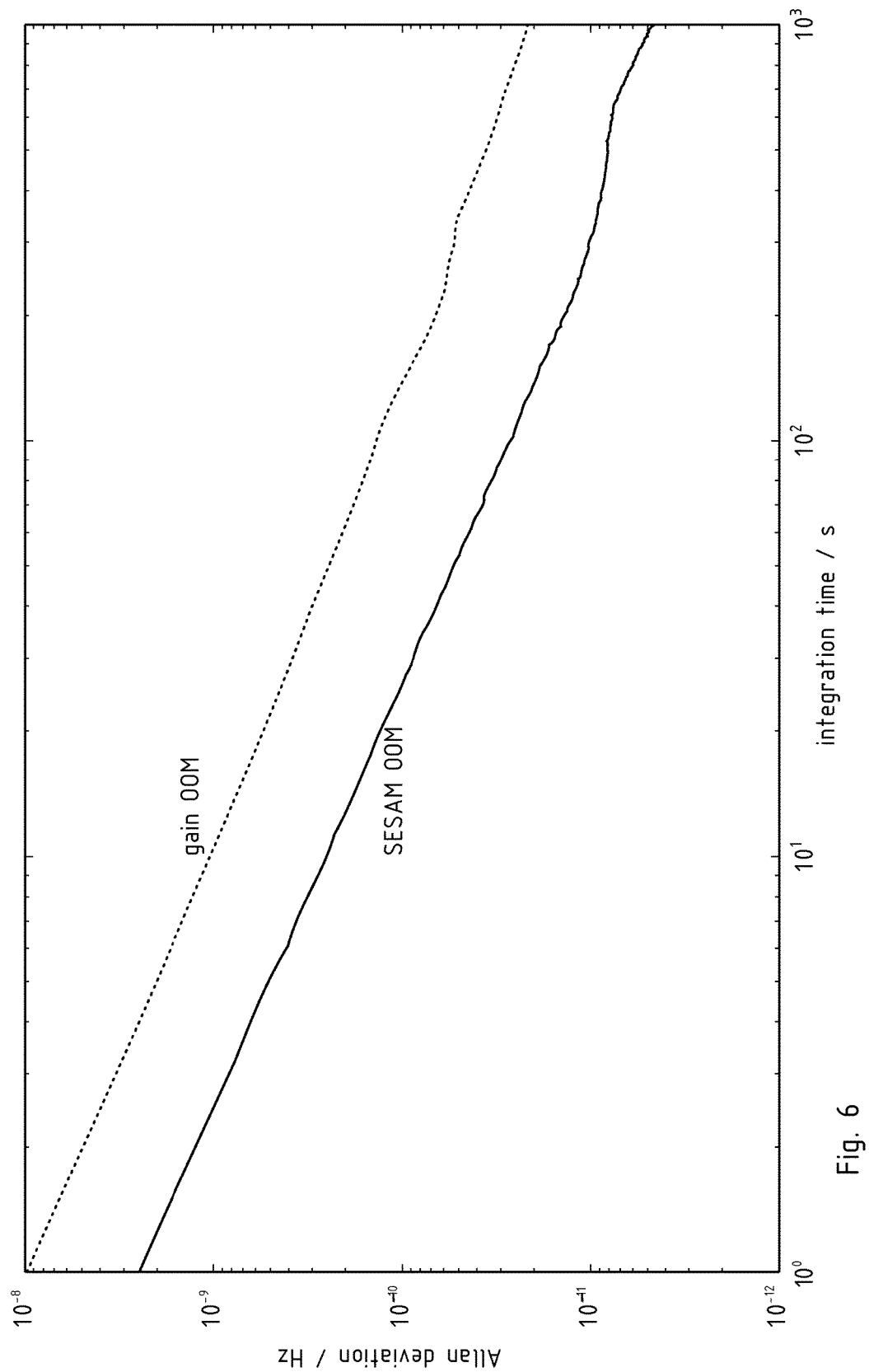
FIG. 6 plots the Allan deviation of the CEO frequency achieved with the present invention.

The frequency stability of the CEO beat locked using the new SESAM-pumping method and measured using a dead-time-free counter shows an improvement of about a factor of 4 in the Allan deviation in comparison to the standard pump current stabilization as shown in FIG. 6 that plots the Allan deviation of the CEO frequency achieved in an Er:Yb:glass DPSSL with the present invention of SESAM-modulation and with the standard gain-modulation via the pump current for comparison.

Figure 7A:
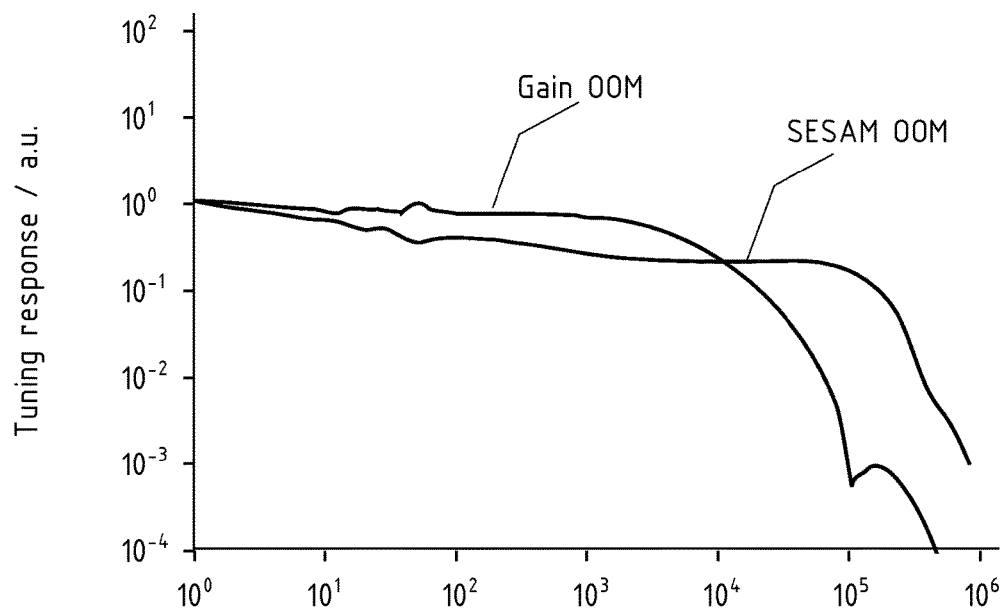
FIGS. 7a and 7b show an example of the dynamic response of the repetition rate in an Er:Yb:glass DPSSL obtained with the present invention in comparison with former known methods.
Figure 7B:
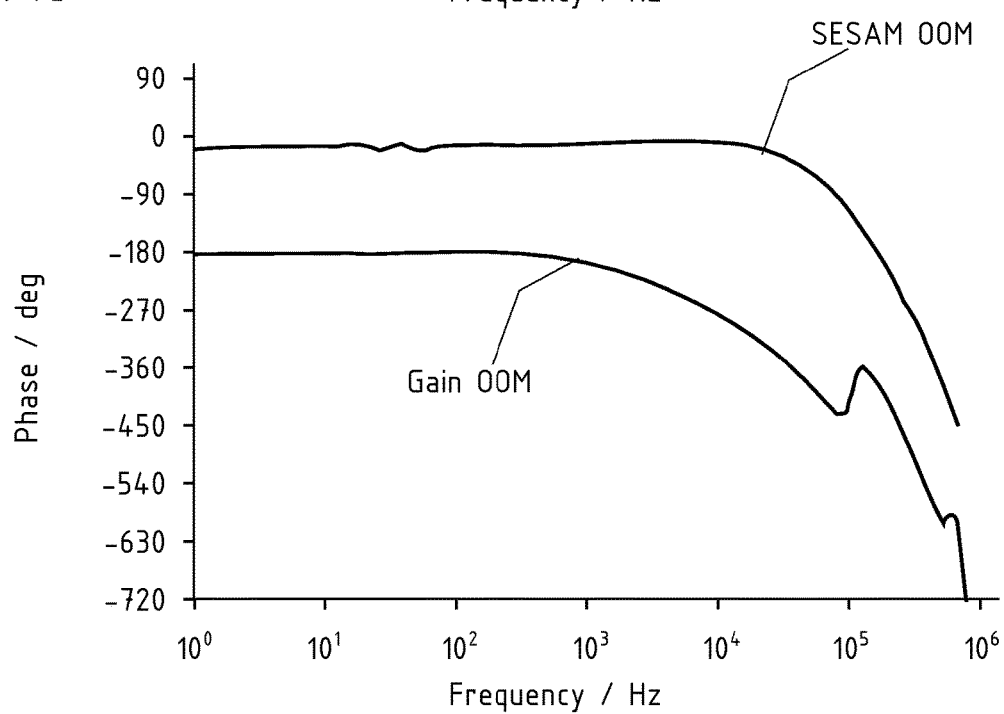

FIGS. 7a and 7b show an example of the dynamic response of the repetition rate in an Er:Yb:glass DPSSL obtained with the present invention of SESAM optical pumping and using the standard method of gain medium modulation via the pump current for comparison. The upper panel shows the dynamic tuning response and the lower panel displays the phase shift. This figure illustrates the potential of the present invention for high bandwidth stabilization of the repetition rate of a frequency comb.

The newly proposed optically-controlled modulator to control and stabilize the CEO beat of a modelocked laser makes use of optical pumping of the SESAM that is already incorporated in the laser cavity for modelocking in one possible embodiment of the invention. This embodiment does not imply any change in the laser resonator. Alternatively, one or several additional optically-controlled modulators can be added in the resonator for control of the CEO frequency or the repetition rate of the frequency comb in other embodiments of the invention.

Absorber recombination timescales in the picosecond regime set the limit for the bandwidth of the SESAM-based modulator, which should enable feedback-loop bandwidths far beyond 1 MHz. This makes this novel stabilization technique particularly attractive to self-reference frequency combs from lasers that were not possible to stabilize so far due to a lack a bandwidth, e.g., in the case of high repetition rate lasers with broad CEO linewidth. Moreover, this CEO beat actuator is compatible with high-power lasers such as thin disk lasers for instance.

The optically-controlled SESAM that is used in the present invention constitutes an optically-controlled modulator that has a variable loss coefficient, dependent on the intensity of the SESAM-pumping laser radiation, since the latter optical source is controlled by the error signal that is representative of the phase error of the modelocked laser radiation, the device of the invention achieves a stabilization of the comb CEO frequency or repetition rate.

According to a different embodiment of the present invention the optically-controlled modulator could include an optically active region that is pumped by a suitable optical modulation source, and exhibits a variable gain coefficient. In this variant also, the optical modulator could be controlled such as to stabilize the comb CEO frequency.

In another variant, the optically-controlled modulator could introduce also a variable optical length and, therefore, be used as control modulator to stabilize the repetition rate of the laser source.

Preferably, the recovery dynamics of the optically-controlled modulator is optimized for a lifetime of at least 5% of the cavity roundtrip time, such that efficient bleaching of the absorption with cw-light can be achieved.

The change in optical absorption (or gain) of the optical modulator used in the invention does not need to reach very high values. In typical SESAM-based realization, the optically-controlled modulator is driven such that its optical absorption changes by less than 20%. The figures relative to variable-gain modulators are similar.

In the example presented above, the optical modulator is conveniently integrated in one SESAM of the laser cavity. This is not however a necessary feature, and the optical modulator could be positioned in any suitable location in the laser cavity. In a different embodiment, the laser source of the invention could also include more than one optically-controlled SESAM or more than one optically-controlled modulator. In this manner, among other things, independent stabilization of the CEO and repetition rate could be achieved. The repetition rate of the optical cavity and the output power can vary according to the circumstances and the need, but importantly the present invention allows production of laser light at a cavity repetition rate in excess of 1 GHz, and average power levels above 10 W.

The present invention could use Er:Yb:glass, Yb:KYW; Yb:YAG; Yb:CALGO; Yb:Lu$_2$O$_3$, Yb:KYW or Cr:forsterite, or an optical fibre material comprising Er, Yb, or Tm as laser medium, but is not limited to such active media. It could be extended to any kind of suitable laser material. The geometry of the laser material is also not essential, and the invention could be employed to stabilize frequency combs in which the laser medium is a thin disk, or a fibre, or is in any suitable configuration.

When the optically-controlled modulator is based on a SESAM device, this could comprise a stack of GaAl and AlAs layers or a stack comprising InP layers, and an embedded quantum well, but could also be realized with any other suitable semiconductor structure, including for example, saturable absorbers based on embedded quantum dots, arranged or not in layered structures, or any suitable nonlinear optical device. The quantum well(s) or quantum dot layer(s) may be integrated in a transmissive structure.

Further, the duration of light pulses generated in the source of the invention can span between 1 fs and 1000 fs, preferably lower than 300 fs.

Finally, the optically-controlled modulator needs not necessarily be optically-pumped by a laser source, but other suitable light sources can be considered.

In the above text, the optically-controlled modulator can include a device comprising any one of: an optically-pumped semiconductor (OPS) or a Vertical External Cavity Surface Emitting Laser (VECSEL) or a Semiconductor Disk Laser (SDL) or parts of said device (such as the gain chip), a graphene-based loss modulator, a carbon-nanotube based loss modulator, or a dye-based absorber. Moreover, the acronym SESAM can include any one of the following expressions: Semiconductor Saturable Absorber Mirror, or Saturable Absorber Mirror (SAM), or Saturable Absorber (SA), or Saturable Mirror (SM), or Saturable Bragg Reflector (SBR).

The invention claimed is:

1. A laser source that generates an optical frequency comb, comprising a pumped laser medium placed inside an optical system or cavity that incorporates at least one optically-controlled modulator, a detector generating an error signal, and a modulation optical source that is controlled by the error signal and whose radiation is directed onto said optically-controlled modulator thereby stabilizing a Carrier-Envelope Offset (CEO) frequency and/or a CEO phase and/or a repetition rate of said source, wherein said optically-controlled modulator has a variable gain or loss coefficient.

2. The source of claim 1, wherein said error signal is representative of the CEO frequency and/or phase and/or repetition rate of the laser radiation source.

3. The source of claim 1, wherein said optically-controlled modulator includes a SESAM (Semiconductor Saturable Absorber Mirror), and/or a SBR (Saturable Bragg Reflector), a transmissive semiconductor absorber, and/or a VECSEL (Vertical External Cavity Surface Emitting Laser), and/or a SDL (Semiconductor Disk Laser) and/or a carbon-nanotube based loss modulator, and/or a dye-based absorber, and/or a graphene-based loss modulator.

4. The source of claim 1, wherein said optically-controlled modulator is based on one or several optically-pumped quantum wells or quantum dots.

5. The source of claim 1, wherein said optically-controlled modulator is integrated in a reflective structure.

6. The source of claim 5, wherein said optically-controlled modulator is arranged to modelock the laser source.

7. The laser source of claim 6, wherein the detector comprises a supercontinuum-generating nonlinear medium and an f-to-2f interferometer.

8. The laser source of claim 1, wherein said pumped laser medium comprises one of: Er:Yb:glass, Yb:KYW; Yb:YAG; Yb:CALGO; Yb:Lu2O3, Yb:LuScO, Yb:ScO or Cr:forsterite DPSSLs, or a glass material comprising Er, Yb, or Tm, or the material Ti: Sapphire.

9. The laser source of claim 1, wherein said optically-controlled modulator comprises a stack of GaAs and AlAs layers or a stack comprising InP layers, and one or several embedded quantum well(s).

10. The laser source of claim 1, wherein the pumped laser medium is a thin disk or a fibre laser.

11. The laser source of claim 1, wherein the optical cavity comprises an element for dispersion control.

12. The laser source of claim 1, wherein the laser medium and/or the optically-controlled modulator are optically pumped by one or more laser sources.

13. A coherent radiation source that generates an optical frequency comb, comprising a pumped nonlinear medium or a pumped laser medium placed inside an optical cavity that incorporates at least one extra-cavity optically-controlled modulator, a detector generating an error signal, and a modulation optical source that is controlled by the error signal and whose radiation is directed onto said optically-controlled modulator thereby stabilizing a CEO frequency and/or a CEO phase and/or a repetition rate of the laser output of said source.

14. A laser source that generates an optical frequency comb, comprising: a laser resonator, a pumped gain medium inside said laser resonator, an optically-controllable modulator inside said laser resonator, a detector arranged to generate an error signal representative of a Carrier-Envelope Offset frequency of the laser source, a modulation optical source whose radiation is directed onto said optically-controllable modulator, and a controller circuit receiving said error signal and arranged for controlling said modulation optical source to stabilize the Carrier-Envelope Offset frequency of said laser source.

15. A laser source that generates an optical frequency comb, comprising a pumped laser medium placed inside an optical system or cavity that incorporates at least one optically-controlled modulator, a detector generating an error signal, and a modulation optical source that is controlled by the error signal and whose radiation is directed onto said optically-controlled modulator thereby stabilizing the Carrier-Envelope Offset (CEO) frequency and/or the CEO phase and/or the repetition rate of said source, wherein said optically-controlled modulator has a variable optical length.

* * * * *